US005731638A

United States Patent [19]

Niimi

[11] Patent Number: 5,731,638

[45] Date of Patent: Mar. 24, 1998

[54] STARTER MOTOR HAVING A TWO STAGE MAGNETIC SWITCH AND CURRENT LIMITING MEMBER

[75] Inventor: Masami Niimi, Handa, Japan

[73] Assignee: Nippondenso Co., Ltd., Kariya, Japan

[21] Appl. No.: 559,602

[22] Filed: Nov. 20, 1995

[30] Foreign Application Priority Data

| | | | |
|---|---|---|---|
| Nov. 22, 1994 | [JP] | Japan | 6-287772 |
| Aug. 23, 1995 | [JP] | Japan | 7-215033 |

[51] Int. Cl.[6] F02N 11/00; H02P 9/04

[52] U.S. Cl. 290/38 R; 74/7 R; 123/179.1

[58] Field of Search 290/38 R, 48; 123/179.25, 179.3, 179.1; 74/7 A, 7 E, 7 R, 6

[56] References Cited

U.S. PATENT DOCUMENTS

| | | | |
|---|---|---|---|
| 4,305,002 | 12/1981 | Mortensen | 290/38 R |
| 4,389,692 | 6/1983 | Sander et al. | 361/29 |
| 4,494,162 | 1/1985 | Eyler | 361/29 |
| 4,674,344 | 6/1987 | Kazino et al. | 74/7 A |
| 5,159,908 | 11/1992 | Eyermann et al. | 123/179.1 |
| 5,239,954 | 8/1993 | Boegner et al. | 123/179.3 |
| 5,443,553 | 8/1995 | Shiga et al. | 74/7 R |

FOREIGN PATENT DOCUMENTS

| | | |
|---|---|---|
| 51-130737 | 11/1976 | Japan . |
| 59-0305641 | 2/1984 | Japan . |
| 1-136679 | 9/1989 | Japan . |
| 1-17337 | 12/1989 | Japan . |
| 3-001267 | 1/1991 | Japan . |

*Primary Examiner*—Clayton E. LaBalle
*Assistant Examiner*—Nicholas Ponomarenko
*Attorney, Agent, or Firm*—Cushman Darby & Cushman IP Group of Pillsbury Madison & Sutro LLP

[57] ABSTRACT

First and second switches are disposed in a housing which accommodates a magnetic switch of a starter motor. The magnetic switch is composed of a plunger and a exciting coil to drive the plunger. A movable contact of the first switch is mechanically connected to the plunger at such a space from a stationary contact of the first switch that it supplies driving current through a current limiting resistor when a pinion of the starter motor is brought in contact with a ring gear of an engine. A movable contact of the second switch is mechanically connected to to the plunger at such a space that it bypasses the current limiting resistor when the pinion is brought in mesh with the ring gear. A timer composed of a bimetal switch is provided to interrupt the driving current through the current limiting resistor if the resistor is heated at a designated temperature.

11 Claims, 6 Drawing Sheets

F/G. 3

STARTER MOTOR HAVING A TWO STAGE MAGNETIC SWITCH AND CURRENT LIMITING MEMBER

CROSS REFERENCE TO RELATED APPLICATION

The present application is based on and claims priority from Japanese Patent Applications Hei 6-287772 filed on Nov. 22, 1994 and Hei 7-215033 filed on Aug. 23, 1995, the contents of which are incorporated herein by reference.

BACKGROUND OF THE INVENTION

1. Field of the Invention

The present invention relates to a starter for an internal combustion engine and, more particularly, to a starter which rotates at a low speed before completing connection with an engine and changes to rotate at a high speed after completing connection with the engine.

2. Description of Related Art

Japanese Utility Model Unexamined publication Hei 1-136679 discloses a related starter, in which driving current is supplied through a current limiting resistor to drive the starter motor at a low speed until a designated time period passes and, thereafter, the driving current is supplied through a bypass circuit to increase the rotational speed.

The above structure is intended to reduce shocks caused when a pinion gear and a ring gear, which are disposed between the engine and the starter, mesh with each other.

However, in the above structure, the driving current continues to be supplied through the resistor for a period after the pinion gear and the ring gear have meshed with each other. Because it requires approximately 0.1 second for the pinion of the starter to mesh with the ring gear after the starter rotates, the necessary duration of limited starter driving current must be considered when designing the current limiting resistor.

The high starter driving current through the current limiting resistor results in high power dissipation and requires the resistor to have large thermal capacity. For example, a 0.05 Ω current limiting resistor for a 12 V type starter of a passenger car requires a 2.8 kW capacity. As such, important design considerations must include the size of the resistor, thermal insulation from surrounding portions, location and space for the thermal insulation material and the material's cost.

SUMMARY OF THE INVENTION

The present invention is made in view of the above problems, and a primary object of the present invention is to provide a compact starter which reduces energy consumption caused by the current limiting resistor and cost of the heat insulation.

Another object of the present invention is to provide a starter for an internal combustion engine which includes a current limiting member limiting current supplied to the motor, a first switch supplying driving current from a battery to the current limiting member when a pinion of the starter is brought in contact with a ring gear of an engine, a second switch bypassing the current limiting member when the pinion is brought in mesh with the ring gear, first means for driving the first and second switches according to operation of the pinion, and second means interrupting the driving current supplied to the current limiting member when power consumption of the current limiting member exceeds a designated value.

Another object of the present invention is to provide a starter wherein the above second means is composed of a bimetal switch which operates at a designated temperature.

A further object of the present invention is to provide a starter wherein the first switch has a first movable contact secured to a plunger and a first stationary contact spaced so that the first switch closes when the pinion is in contact with the ring gear, and the second switch has a second movable contact secured to the plunger and a second stationary contact spaced so that the second switch closes when the pinion is in mesh with the ring gear.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 5 is a circuit diagram of a magnet switch for a starter according to a fifth embodiment of the present invention a.

DETAILED DESCRIPTION OF THE PREFERRED EMBODIMENT

Preferred embodiments will be described with reference to appended drawings hereafter.

Figure 1:
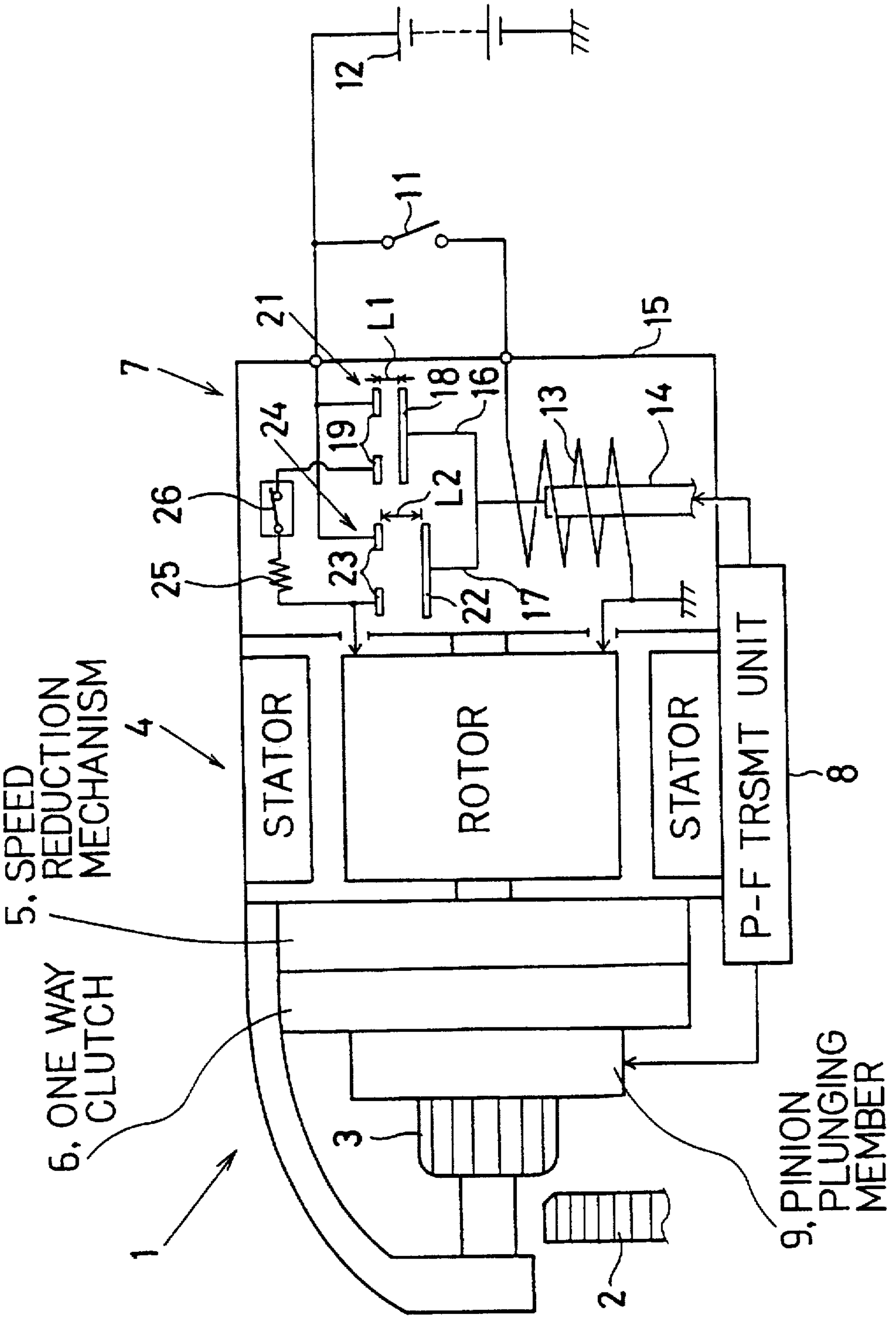
FIG. 1 is a schematic view of a starter according to a first embodiment of the present invention.

A starter 1 according to a first embodiment is explained with reference to FIG. 1. The starter 1 includes a pinion 3 to be in mesh with a ring gear 2 which is carried by a crank shaft (not shown) of an internal combustion engine, a driving motor 4 which has a stator and a rotor for driving the pinion 3, a speed reduction mechanism 5, a one way clutch 6 which interrupts the driving power from the motor to the ring gear when the pinion is going to be driven by the ring gear 2, a magnet switch 7 which supplies the driving motor with two staged electric currents and generates a pinion plunging force, a plunging force transmitting member 8 and a pinion plunging member 9.

The magnet switch 7 is disposed in a housing 15 which is secured to a rear portion of the motor 4, and has an exciting coil 13 which is energized by a battery 12 when a starter switch 11 is turned on. A plunger 14 driven by the exciting coil 13, has first and second contact shafts 16 and 17 disposed at an end of the plunger 14. A first movable contact 18 is carried by the first contact shaft 16 and composes a first switch 21 with a pair of first stationary contacts 19 which are secured to the housing 15. A second movable contact 22 is fixed on an end of the second contact shaft 17 and composes a second switch 24 with a pair of second stationary contacts 23.

The first movable contact 18 is made of good conductive material such as copper and is secured to the first contact shaft 16 via an insulating washer (not shown) which is slidably held by a retaining ring (not shown) secured to the first contact shaft 16. The insulating washer is biased upward by a contact spring (not shown).

The first contact shaft 16 moves even after the first movable contact 18 contacts the first stationary contacts 19. That is, the plunger 14 is allowed to move upward further even after the first movable contact 18 comes into contact with the first stationary contact 19. Distance L1 between the first movable contact 18 and the paired first stationary contacts 19 is arranged so that the first switch 21 is closed when the pinion 3 is brought by the pinion plunging member 9 in contact with the ring gear 2.

The second switch operates in a manner similar to the first switch. The second movable switch 22 is made of good conductive material such as copper, and carried by the second contact shaft 17 via an insulating washer (not shown) which is slidably held by a retaining ring secured to an end of the second shaft 17. The insulating washer is biased upward by a contact spring (not shown).

The second movable contact 22 moves upward, even after the first movable contact 18 contacts the first stationary contacts 19. Distance L2 between the second movable contact and the paired second stationary contacts 23 is arranged so that the second switch 24 is connected when the plunger 14 moves further and the pinion plunging member 9 causes the pinion 3 to mesh with the ring gear 2. That is, the distance L1 is set smaller than the distance L2.

The paired first stationary contacts 19 (which is made of copper), when in contact with the first movable contact 18, connects the battery 12 with the driving motor 4 through a current limiting resistor 25 (e.g. resistance between 0.05 Ω and 0.14 Ω).

The paired second stationary contacts 23 (which is made of copper), when in contact with the second movable contact 22, bypasses the current limiting resister 25 to connect the battery 12 with the driving motor 4 directly.

A timer circuit 26 is connected in series with the current limiting resistor 25 to limit the duration the driving motor 4 is supplied with current limited driving current. The timer circuit 26 is equipped with a normally-closed-bimetal-switch which generates heat and bends to open the switch by itself within a short time after the driving current is supplied through the current limiting resistor 25.

When the starter switch 11 is turned on, the exciting coil 13 is energized to generate a magnetic force. The plunger 14 is driven upward by the magnetic force, thereby bringing the first movable switch 18 in contact with the paired first stationary contacts 19. Subsequently, electric power is supplied from the battery 12 through the first stationary switch 21, the timer 26, and the current limiting resistor 25 to the motor 4. Thus, the motor rotates at a low speed. The rotational speed of the motor is reduced by the speed reduction mechanism 5 and transmitted to the pinion 3, which rotates at a low speed. At the same time, the pinion plunging member 9 brings the pinion 3 to the ring gear 2. When the pinion 3 comes substantially in contact with the ring gear 2 at a low rotational speed, it engages the ring gear smoothly.

When the plunger 14 moves upward and the pinion plunging member 9 causes the pinion 3 to be substantially in complete mesh with the ring gear 2, the second movable contact 22 comes into contact with the paired stationary contact 23 (within 0.1 second after the first switch 21 is turned on). As a result, full voltage of the battery is applied to the motor 4 through the second switch 24 which bypasses the timer 26 and the current limiting resistor 25, to rotate the motor 4 at a high speed. The rotational speed of the motor 4 is reduced by the speed reduction mechanism 5, and transmitted through the one way clutch to the pinion 3, thereby increasing the rotational speed of the crank shaft through the pinion 3 and the ring gear 2.

When the engine is started and the starter switch 11 is turned off, the magnetic force of the exciting coil disappears. Consequently, a return spring (not shown) returns the plunger 14 to the original position and the pinion plunging member 9 does not drive the pinion 3 any longer and allows the pinion 3 to leave the ring gear 2. The first and second movable contacts 18 and 22 leave the first and second stationary contacts 19 and 23 to interrupt the driving current, thereby stopping operation of the motor 4 and the pinion 3.

If the pinion 3 fails to mesh with the ring gear for some reason or trouble after the starter switch is turned on and the first switch 21 is closed, the driving current supplied through the current limiting resistor 25 is cut by the timer 26 when the time for supplying the driving current passes a designated time period (within 0.1 second). That is, the timer 26 is heated by the driving current and bends to open the switch, thereby preventing the temperature of the current limiting resistor 25 from rising excessively.

Figure 2:
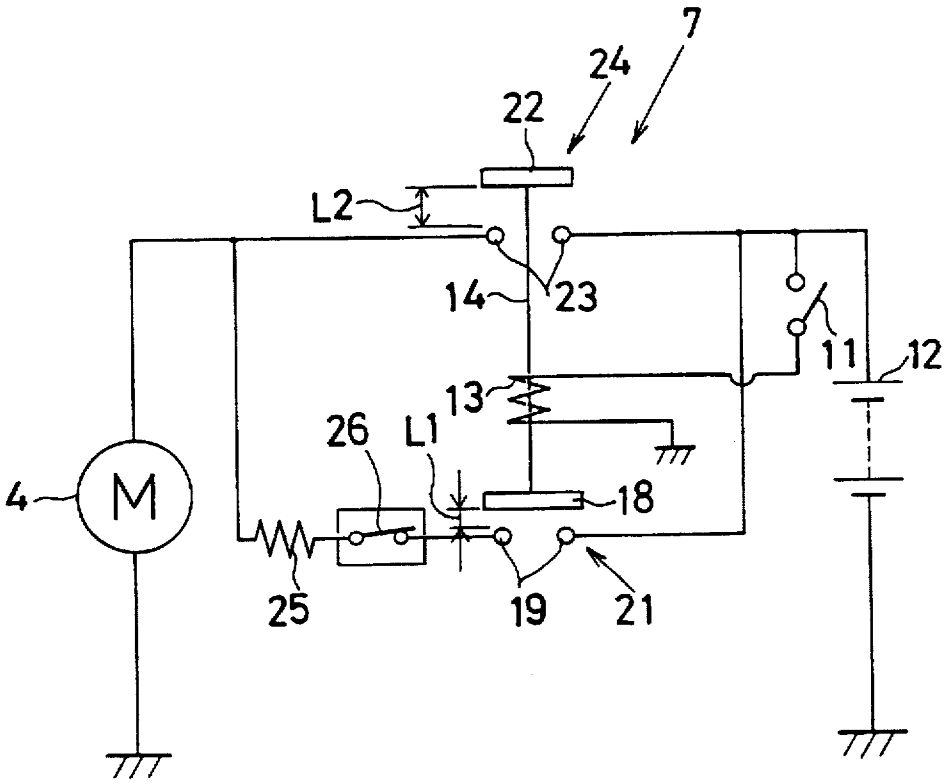
FIG. 2 is a circuit diagram of a magnet switch for a starter according to a second embodiment of the present invention.

FIG. 2 illustrates a circuit diagram of a second embodiment of the present invention. Incidentally, the same reference numerals used in the following figures which illustrate various embodiments represent the same or substantially the same members, parts or portions.

The first movable contact 18 and the second movable contact 22 of the starter according to the first embodiment are moved to opposite ends of the plunger 14 respectively in the starter according to the second embodiment. The operation is substantially the same as the first embodiment, and therefore is omitted.

Figure 3:
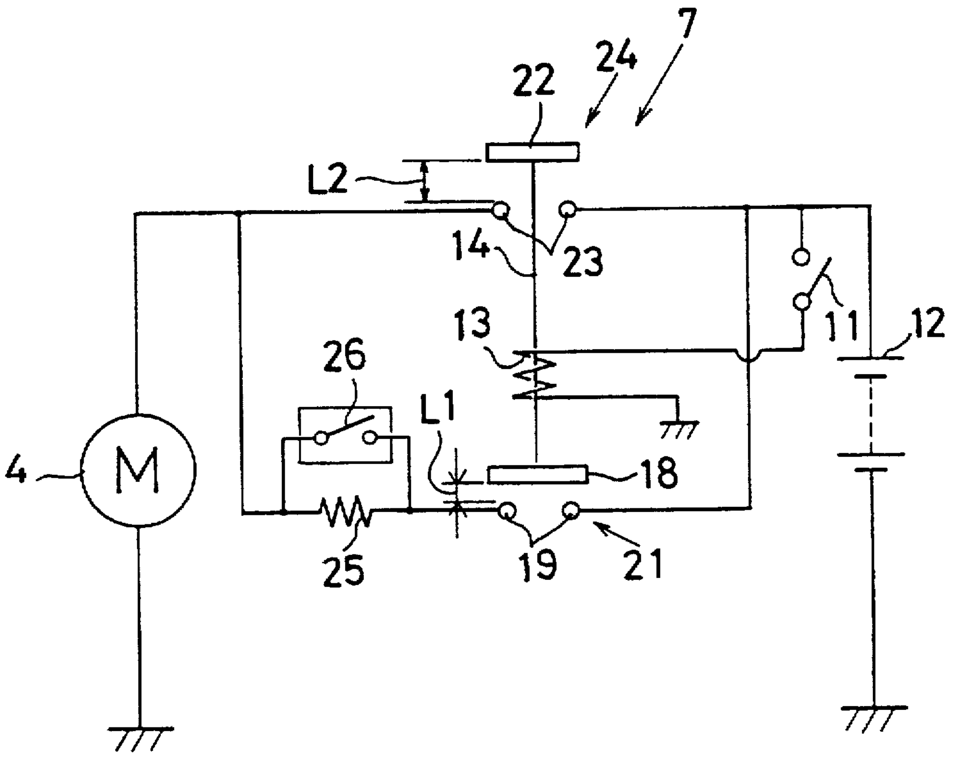
FIG. 3 is a circuit diagram of a magnet switch for a starter according to a third embodiment of the present invention.

As shown in FIG. 3, a timer 26 of a third embodiment has a normally-open-bimetal-switch which is electrically connected in parallel with the current limiting resistor 25 and also thermally connected therewith. As the driving current passing through the current limiting resistor 25 heats to resistor 25 to a designated amount, the timer 26 closes the switch to bypass or short-circuit the current limiting resistor 25. In the third embodiment, the starter 1 can be restarted after some trials without waiting for restoration of the timer 26, however the starter runs at the higher speed in this case.

Figure 4:
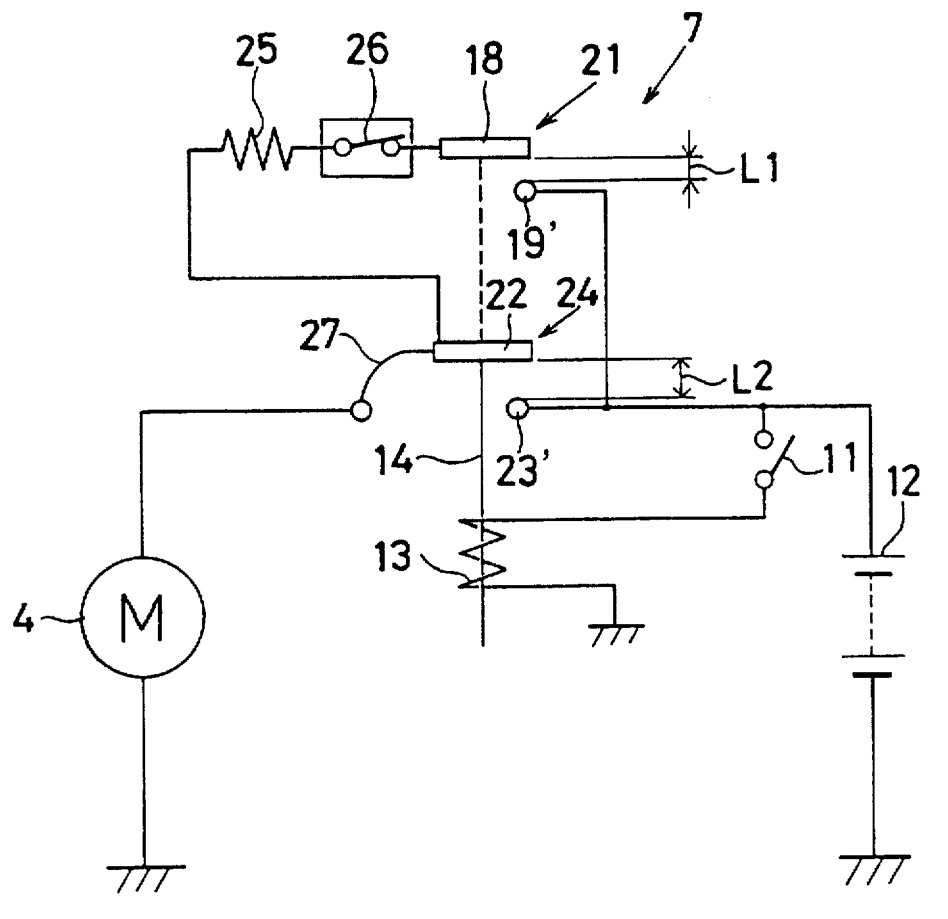
FIG. 4 is a circuit diagram of a magnet switch for a starter according to a fourth embodiment of the present invention.

As shown in FIG. 4, in a magnet switch 7 of a fourth embodiment, the first stationary contact 19 and the second stationary contact 23 of the first embodiment are changed to first and second stationary contacts 19' and 23' having a single contact respectively. A series connection of the current limiting resistor 25 and the timer 26 are connected across the first movable contact 18 and the second movable contact 22. The second movable contact 22 and the motor 4 are connected by a flexible lead wire 27 to permit motion of the second movable contact 22 without restriction.

Figure 5:
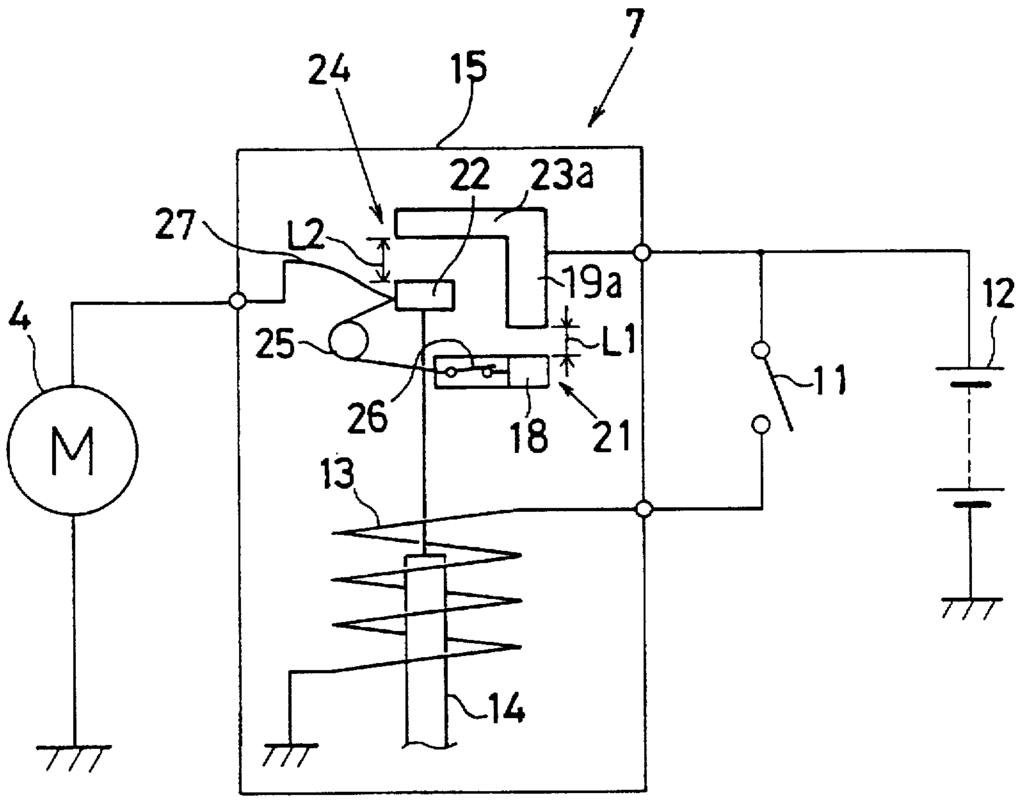

In a magnet switch 7 shown in FIG. 5, the first stationary contact 19 and the second stationary contact 23 of the first embodiment are changed to a common stationary contact having respective contact portions **19*a* and 23*a* in a fifth embodiment. The series circuit of the current limiting resistor 25 and the timer 26 is connected across the first and second movable contacts 18 and 22. The second movable contact 22 and the motor are connected by a flexible lead wire 27** as in the fourth embodiment.

Figure 6:
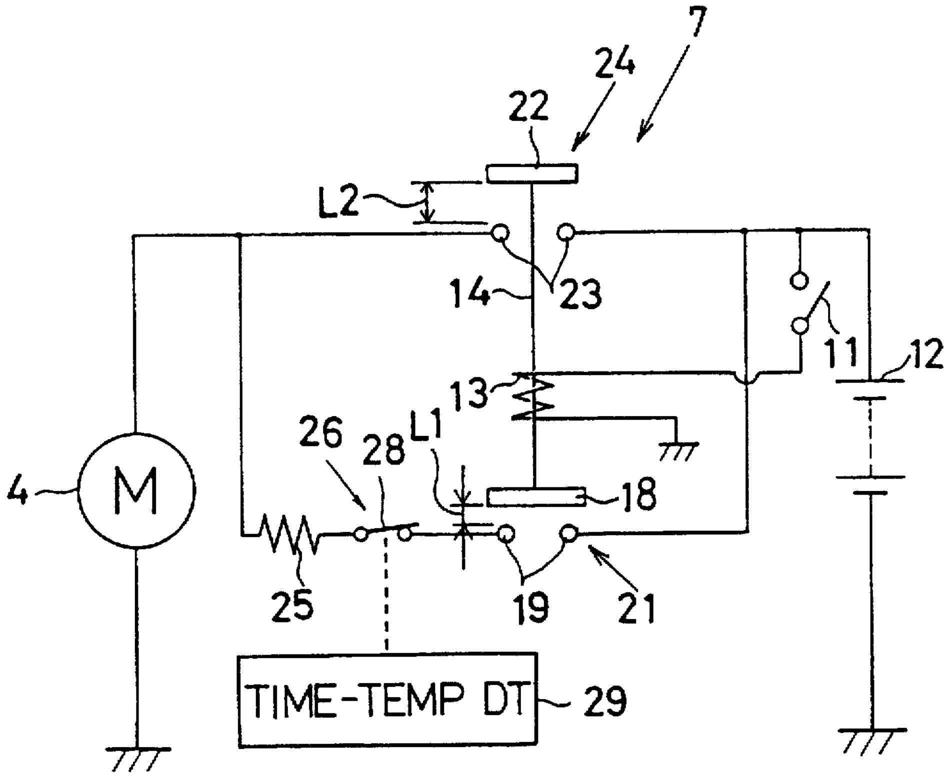
FIGS. 6 is a circuit diagram of a magnet switch according to a sixth embodiment of the present invention.

In a magnet switch 7 shown in FIG. 6, the timer 26 used in the previous embodiments is changed to a time-temperature detecting unit 29 having a relay switch 28. The time-temperature detecting unit 29 is composed of a time detecting section having a capacitor, a resistor and a counter, and a current limiting section having thermistor. Either when the time detecting section detects passing of current supply time or when the current limiting section detects a designated temperature, the time-temperature detecting unit 29 turns off the relay switch 28 to interrupt driving current passing through the current limiting resistor 26.

The series connection of the relay switch 28 and the current limiting resistor 25 may be replaced with a parallel connection thereof as described in the third embodiment with reference to FIG. 3.

The first and second switches 21 and 24 can be driven by a member other than the plunger 14. For example, such member controls the switches as follows: when the starter switch is turned on, the first switch 21 is turned on at the beginning and the second switch 24 is turned on after a certain period of time passes.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A starter for an internal combustion engine having a ring gear and a battery comprising:

a pinion to be in mesh with said ring gear;

a starter motor for rotating said pinion;

a current limiting member for limiting current supplied to said motor;

a first switch for supplying driving current from said battery through said current limiting member to said starter motor;

a second switch for bypassing said current limiting member when said pinion comes substantially in mesh with said ring gear; and means, connected to said current limiting member and said first switch, for interrupting said driving current supplied from said battery to said current limiting member when a predetermined time passes after said driving current is supplied thereto thereby preventing temperature rise of said current limiting member.

2. A starter as claimed in claim 1 further comprising a magnet switch, wherein said magnet switch comprises:

a housing, a plunger, disposed in said housing for driving said pinion and said first and second switches, an exciting coil, disposed in said housing, for driving said plunger, and wherein said housing accommodates said current limiting member and said means for interrupting said driving current.

3. A starter as claimed in claim 1, wherein said means for interrupting said driving current comprises a bimetal switch for operating at a designated temperature.

4. A starter as claimed in claim 1, wherein said current limiting member comprises a resistor.

5. A starter as claimed in claim 2, wherein said first switch comprises a first movable contact mechanically connected to said plunger and a first stationary contact spaced at such a first distance that said first switch closes when said pinion is in contact with said ring gear; and said second switch comprises a second movable contact mechanically connected to said plunger and a second stationary contact spaced at such a second distance that said second switch closes when said pinion is in mesh with said ring gear, wherein said first distance is shorter than said second distance.

6. A starter as claimed in claim 3, wherein said second switch interrupts currents when said pinion moves to a predetermined distance toward said ring gear by bypassing said bimetal switch of said interrupting means.

7. A starter for an internal combustion engine having a ring gear and a battery comprising:

a pinion to be in mesh with said ring gear;

a motor for rotating said pinion;

a pinion driving mechanism having a plunger and a driving coil for meshing said pinion with said ring gear when energized;

a current limiting member, connected in series with said motor, for limiting driving current supplied to said motor;

a first switch driven by said plunger for supplying driving current to said motor through said current limiting member until said pinion driving mechanism brings said pinion in contact with said ring gear;

a second switch driven by said plunger for bypassing said current limiting member when said pinion driving mechanism brings said pinion substantially in mesh with said ring gear; and means, connected to said current limiting member and said first switch, for interrupting said driving current through said current limiting member to said motor when power consumption of said current limiting member exceeds a designated value.

8. A starter as claimed in claim 7, wherein said first switch comprises a first movable contact secured to said plunger and a first stationary contact spaced so that said first switch closes when said pinion is in contact with said ring gear; and said second switch comprises a second movable contact secured to said plunger and a second stationary contact spaced so that said second switch closes when said pinion is in mesh with said ring gear.

9. A starter as claimed in claim 8, further comprising a case for accommodating said current limiting member and said means for interrupting said driving current.

10. A starter as claimed in claim 9, wherein said means for interrupting said driving current comprises a bimetal switch connected between said current limiting member and said first switch for opening a switch at a temperature caused by power consumption corresponding to said designated value.

11. A starter as claimed in claim 10, wherein said current limiting member comprises a resistor.

* * * * *